J. NEMETZ.
ANTISLIPPING DEVICE FOR HORSESHOES.
APPLICATION FILED FEB. 6, 1915.

1,149,077.

Patented Aug. 3, 1915.

Witnesses
J.T.L. Wright
Fo. Ackman

Inventor
J. Nemetz
By Victor J. Evans
Attorney

UNITED STATES PATENT OFFICE.

JAMES NEMETZ, OF YANTIC, MONTANA.

ANTISLIPPING DEVICE FOR HORSESHOES.

1,149,077. Specification of Letters Patent. Patented Aug. 3, 1915.

Application filed February 6, 1915. Serial No. 6,587.

*To all whom it may concern:*

Be it known that I, JAMES NEMETZ, a citizen of the United States, residing at Yantic, in the county of Blaine and State of Montana, have invented new and useful Improvements in Antislipping Devices for Horseshoes, of which the following is a specification.

This invention relates to horseshoes, and more particularly to an anti-slipping attachment therefor.

The primary object of the invention is to provide a horseshoe with an anti-slipping device which will effectually prevent slipping and which includes a readily detachable tread member which may be easily replaced without removing the shoe.

Briefly stated, the invention comprises two main elements. One is a supporting member interposed between the animal's hoof and the upper surface of the shoe; and the other is a tread member detachably connected to said supporting member.

Figure 1:
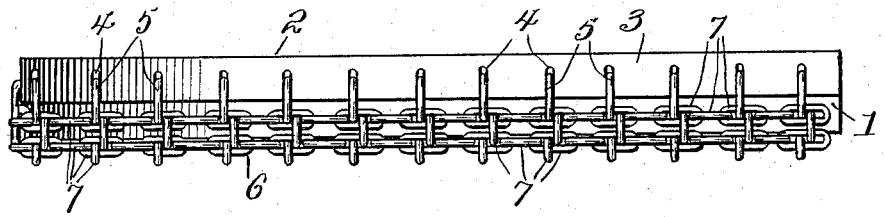
Figure 2:
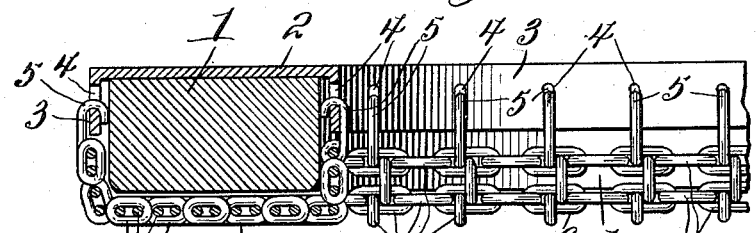
Figure 3:
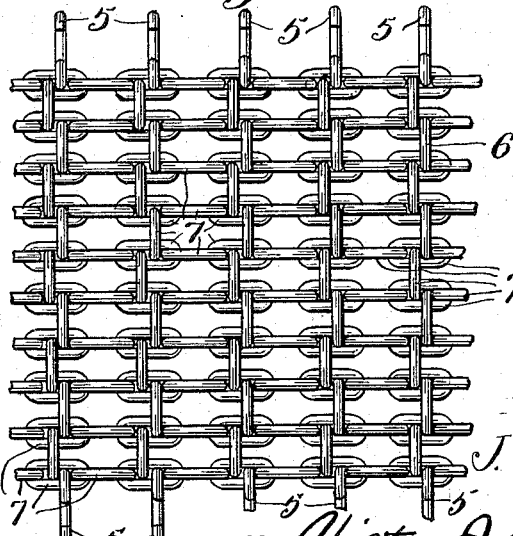

The inventive idea involved is capable of receiving a variety of mechanical expressions, one of which is shown in the accompanying drawings, wherein:

Figure 1 is a side elevation of the invention; Fig. 2 is a fragmentary end elevation, showing the shoe and anti-slipping device in cross section; and Fig. 3 is a fragmentary plan view of the tread member used in connection with the invention.

Referring more particularly to the accompanying drawing, the numeral 1 indicates a horseshoe which is preferably made slightly wider than the ordinary shoe in order to provide a larger tread surface.

2 indicates a supporting member which is preferably made of sheet metal and of a substantially inverted U-shaped formation. This supporting member is adapted to be interposed between the animal's hoof and the upper surface of the shoe after the latter has been fitted but before it has been secured in position on the hoof. The shoe is then secured in position as is ordinarily done by driving nails through the same and also through the horizontal base of the supporting member. After being secured in position, the depending sides 3 of the supporting member 2 are adapted to extend along the sides of the shoe 1 approximately for a distance greater than half their length and are preferably spaced a slight distance from the said sides, as clearly illustrated in Fig. 2.

The sides 3 of the supporting member are both provided with small apertures 4 and adapted to receive the small hook lugs 5 attached to the longitudinal edges of the tread member 6 in any preferred manner. This tread member comprises a plurality of small chain links 7, which are all connected in a manner to form a continuous mat which effectually covers the entire bottom surface of the shoe and which also extends up the sides thereof so that when the tread member is to be attached to the supporting member, the lugs 5 may be readily inserted into the openings 4 of the latter.

From the foregoing description, it will thus be seen that the invention comprises an anti-slipping device which is simple and compact in construction and in which the tread member may be readily detached from the supporting member upon the occasion of the former being worn out and another tread member placed in position.

Having thus described the invention, what is claimed is:

1. An anti-slipping device for horseshoes comprising a substantially U-shaped supporting member secured between the shoe and the hoof, and a detachable tread member including chain links connected to said supporting member.

2. An anti-slipping device for horseshoes comprising a substantially U-shaped supporting member having the sides thereof extending partly the length of the sides of the shoe and spaced therefrom, and a tread member detachably connected to the sides of said supporting member.

3. An anti-slipping device for horseshoes comprising a substantially U-shaped supporting member provided with openings in the sides thereof, a tread member including chain links, and attaching devices carried by said tread member and engaging the openings in said supporting member.

4. An anti-slipping device for horseshoes comprising a substantially U-shaped supporting member secured between the shoe and the hoof and provided in the sides thereof with openings, a tread member including chain links covering the bottom of the shoe and extending partially up the sides thereof, and a plurality of attaching devices arranged on the longitudinal edges of said tread member and adapted to detachably engage the openings in said supporting member.

In testimony whereof I affix my signature in presence of two witnesses.

JAMES NEMETZ.

Witnesses:
CLAUDE F. MORRIS,
EXZELIA J. PEPIN.

Copies of this patent may be obtained for five cents each, by addressing the "Commissioner of Patents, Washington, D. C."